United States Patent

[11] 3,588,688

| [72] | Inventor | Arthur M. Lockie<br>Sharpsville, Pa. |
|---|---|---|
| [21] | Appl. No. | 789,639 |
| [22] | Filed | Dec. 10, 1968 |
| [45] | Patented | June 28, 1971 |
| [73] | Assignee | Westinghouse Electric Corporation<br>Pittsburgh, Pa. |

[54] IMPEDANCE CHECKING APPARATUS FOR SHIELDED ELECTRICAL SYSTEMS
10 Claims, 7 Drawing Figs.

[52] U.S. Cl. .................................... 324/51,
339/113
[51] Int. Cl. ............................................ G01r 31/02
[50] Field of Search ............................... 324/51, 52,
54, 96, 127, 95, 106; 340/253, 256; 339/113, 136,
28; 317/18; 250/239

[56] References Cited
UNITED STATES PATENTS

| 1,745,419 | 2/1930 | Henneberger | 324/52X |
| 2,716,216 | 8/1955 | Schwenzfeier | 324/52X |
| 2,729,788 | 1/1956 | Schweitzer | 324/127 |
| 2,808,566 | 10/1957 | Douma | 324/127 |
| 2,869,364 | 1/1959 | Kabik et al. | 324/96X |
| 3,263,164 | 7/1966 | Solgere | 324/51 |
| 3,320,524 | 5/1967 | Miller | 324/54 |
| 3,332,011 | 7/1967 | Maione et al. | 324/96 |
| 3,399,348 | 8/1968 | Praglin et al. | 324/96 |

FOREIGN PATENTS

| 652,423 | 11/1962 | Canada | 324/51 |
| 640,335 | 12/1936 | Germany | 324/96 |

*Primary Examiner*—Gerard R. Strecker
*Attorneys*—A. T. Stratton, F. E. Browder and Donald R. Lackey ABSTRACT: Electrical circuit checking apparatus for determining the condition of an electrical load circuit prior to connecting an energized conductor thereto. The circuit checking apparatus connects a current limiting impedance of known magnitude between the energized conductor and the load circuit to be checked, and provides an indication of the impedance of the load circuit relative to the magnitude of the current limiting impedance.

WITNESSES
Wm. B. Sellers
James F. Young

INVENTOR
Arthur M. Lockie
BY
Donald C. Lackey
ATTORNEY

IMPEDANCE CHECKING APPARATUS FOR SHIELDED ELECTRICAL SYSTEMS

BACKGROUND OF THE INVENTION

1. Field of the Invention

The invention relates to apparatus for checking the impedance of an electrical load circuit, to determine if an energized conductor may be safely connected to the load circuit.

2. Description of the Prior Art

Separable "plug-in" type electrical cable connectors are widely used in underground electrical distribution systems, because they enable operating and maintenance personnel to quickly provide a sealed, insulated, moistureproof electrical connection between the mating portions, as well as to quickly separate the mating portions of the connector when the circuit is to be opened.

While the separable plug-in type connector simplifies the task of operating personnel, improper use of the connectors may damage the connector, and in certain circumstances, present a hazard to operating personnel. For example, if an energized connector is plugged into a mating portion on a transformer, or other cable circuit, containing a low impedance fault, the connector may be damaged beyond repair, and if it ruptures the operator may be injured. In certain applications, the transformer cover may be displaced and burning oil ejected. All of these events may occur, even when the separable connector is said to have fault close-in capability. Further, by designing separable connectors with some degree of fault close-in capability, their cost is increased, while providing an unjustified sense of security which may increase the probability of the serious consequences cited, due to improper use of the connector.

It would be preferable to provide connectors which are not to be coupled when the load circuit has a low impedance fault, as this will provide the lowest cost connector, and at the same time it will not invite improper usage. However, some portable means must then be provided which will enable operating personnel to quickly and economically determine whether or not the load circuit has a low impedance fault.

SUMMARY OF THE INVENTION

Briefly, the present invention is a portable load circuit checker which is temporarily connected between the energized connector and the load circuit by the operator, and which indicates the presence of a low impedance fault in the load circuit. The load circuit checker contains a current limiting impedance having a magnitude which will limit the current flow between the energized connector and the load circuit to a value which is within the close-in and load-break capability of the connector, even when the load circuit has a fault of zero impedance. The current limiting impedance of the circuit checking apparatus is permanently connected to male and female connector portions, which enables it to be quickly connected to the female and male portions, respectively, of the separable connector which is to be coupled. Sensing and indicating means are also provided, with the sensing means obtaining a signal responsive to a predetermined condition of the current limiting impedance, such as the magnitude of the current flow through the current limiting impedance, the voltage drop across the current limiting impedance, or the voltage drop between the load side of the current limiting impedance and ground, and with the indicating means, which is responsive to the sensing means, providing a positive indication of whether or not the energized connector may be safely plugged directly into the load circuit.

BRIEF DESCRIPTION OF THE DRAWING

Further advantages and uses of the invention will become more apparent when considered in view of the following detailed description and drawings, in which.

DESCRIPTION OF THE PREFERRED EMBODIMENTS

Figure 1:
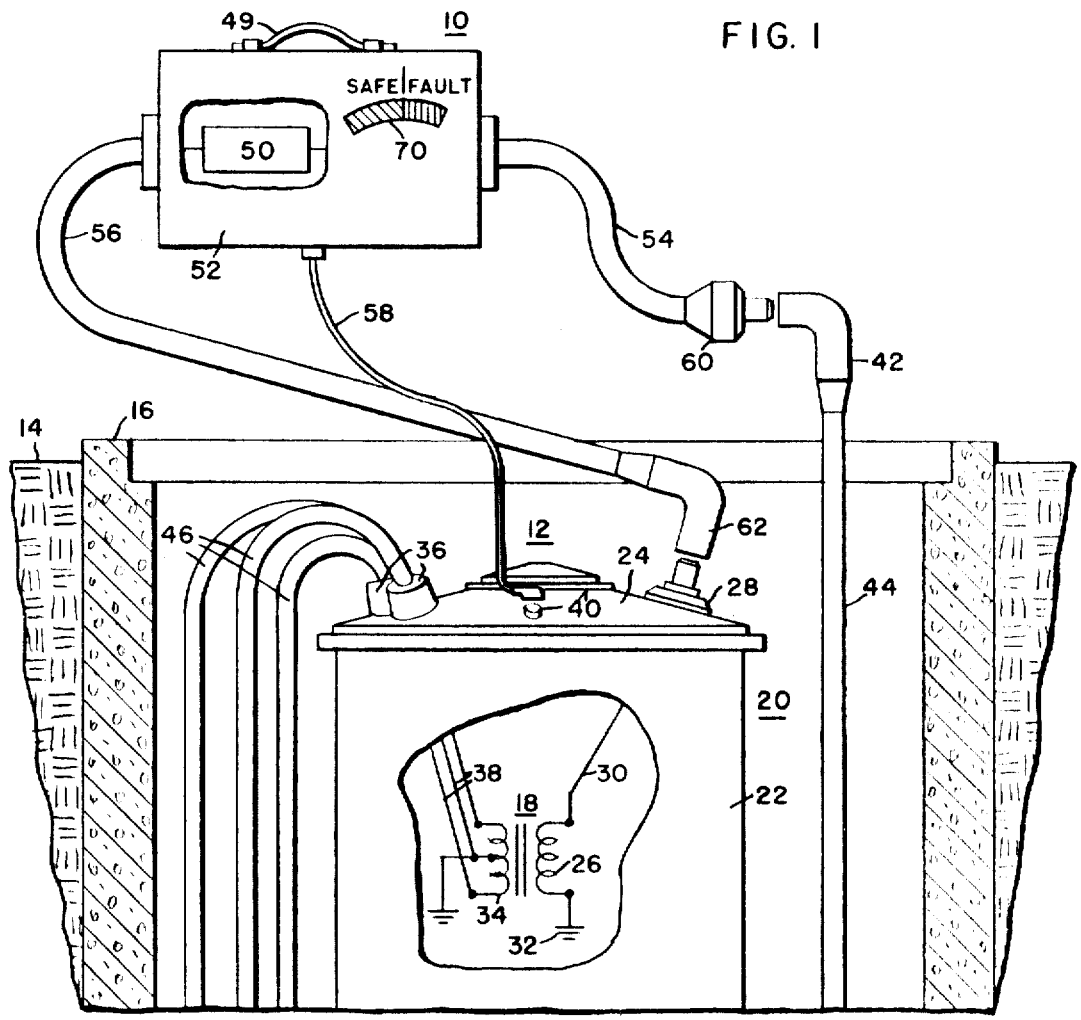
FIG. 1 is an elevational view of circuit checking apparatus constructed according to the teachings of the invention, illustrating a typical application of the circuit checking apparatus.

Referring now to the drawings, and FIG. 1 in particular, there is illustrated an elevational view of portable circuit checking apparatus 10, which is constructed according to the teachings of the invention, and a typical application for the apparatus 10, which includes a distribution type transformer 12 connected in an underground electrical power distribution system. Transformer 12 is disposed below ground level 14 in a suitable vault 16, with the vault being illustrated without its cover, in order to allow access to the transformer 12 by maintenance or service personnel.

Transformer 12 includes a core-coil assembly 18, shown schematically, which is disposed within a sealed enclosure 20, with the enclosure 20 including a tank 22 and a cover 24. The core-coil assembly 18 includes a primary winding 26 connected to a high voltage bushing assembly 28 via conductor 30, and to ground 32, and a low voltage winding 34 connected to low voltage bushings 36 via conductors 38. The transformer enclosure 20 has an external ground terminal 40. The ground terminal 40, high voltage bushing 28, and low voltage bushings 36 are all illustrated as being cover mounted, in order to facilitate operator access thereto.

The high voltage bushing 28 is illustrated as being the male portion of a separable plug-in type connector, adapted for connection to a female portion 42 of the connector, which is mounted on one end of a shielded electrical cable 44, which in turn is connected to a source of AC potential (not shown).

The low voltage bushings 36 are connected to an external load circuit (not shown) via conductors 46.

Before the energized connector portion 42 is plugged into its mating portion 28, such as after transformer 12 is initially installed, or when the connector portion 42 has been removed from the transformer to allow the transformer 12 or the external load circuit to be serviced by operating personnel, the transformer 12 and the load circuit should be checked for low impedance faults. The circuit checking apparatus 10 performs this function by inserting a current limiting impedance 50 between the energized connector portion 42 and the mating connector portion or high voltage bushing 28.

More specifically, circuit checking apparatus 10, which may have a suitable handle 49, or which may be mounted on a dolly, depending upon its weight, includes a metallic enclosure 52 having openings for receiving shielded cables 54 and 56. Cables 54 and 56 have their outer shield portions connected to the metallic enclosure 52, and the enclosure 52 has a lead 58 adapted for connection to ground, such as to the ground terminal 40 on the transformer 12. The inner conductors of cables 54 and 56 extend through the openings in the enclosure 52, where they are connected to opposite ends of the current limiting impedance 50. Cable 54 is adapted for connection to the source of electrical potential, having a male connector portion 60 mounted on its extreme end, which may be plugged into the female connector portion 42 of the cable 44. Cable 56 is adapted for connection to the transformer 12, and thus to the external load circuit, having a female connector portion 62 mounted on its extreme end, which may be plugged into the high voltage bushing or male connector portion 28. Thus, to check the impedance of the transformer 12 and its load circuit, the concentric neutral conductor of cable 44 and the ground conductor 58 of the circuit checking apparatus 10 are connected to ground terminal 40, connector portion 60 of cable 54 is plugged into the energized connector portion 42 of cable 44, and connector portion 62 of cable 56 is plugged into connector portion 28, which is mounted on the transformer 12.

Sensing means, not shown in FIG. 1, but which will be hereinafter described, senses a predetermined condition of current limiting impedance 50, such as the magnitude of the current flowing through the impedance 50, the voltage drop across the impedance 50, or the voltage from the load side of the impedance 50 to ground, and provides a signal for indicating means 70. Indicating means 70 may be an indicating instrument, calibrated to indicate when a low impedance fault exists in the transformer or load circuit, or it may be a go-no-go type indicator, having a flag which is actuated when a fault condition is detected.

The current limiting impedance 50 may be a resistor, or an inductor, having an impedance selected to limit the current flow to a value which is within the make and break rating of the separable connector to be coupled, even when the transformer or external load circuit has a fault of zero impedance. For example, if the power distribution system is a 7200 volt circuit, and the separable connector to be joined has a maximum make and break rating of 200 amperes, a resistor would have to have a magnitude of at least 36 ohms, and an inductor would have to have an impedance of at least 36 ohms. Since the power dissipated in a 36 ohm resistor, and the energy stored in an inductor having an impedance of 36 ohms, when a current of 200 amperes is flowing is quite substantial, and would present a problem even for the very few seconds that the circuit checking apparatus would be connected in the circuit, the practical rating of a resistor or inductor would be much greater than the 36 ohm minimum. The upper limit on the value of the impedance would that value at which the sensitivity of the circuit checking apparatus 10 would start to be substantially impaired. In other words, the current limiting impedance should not be so large compared with the normal impedance of the load circuit, that the current flow through the current limiting impedance would be nearly the same magnitude when the load circuit has a zero impedance fault as when the load circuit is operating normally.

For example, a suitable value for current limiting impedance 50 would be 150 ohms. Inserting the load checking apparatus 10 in series with a 7200 volt circuit, with a current limiting impedance having a value of 150 ohms, would allow 48 amperes to flow if the circuit had a zero impedance fault, and about 38 amperes if the circuit has at least 36 ohms impedance. Thus, the indicating instrument 70 could be rated 50 amperes full scale, with the scale having a "safe" or green zone of 0 to 40 amperes, and a "fault" or red zone from 40 to 50 amperes.

In some instances, the circuit may not have a low impedance fault, but one of a relatively high impedance, though still much less than the "normal" impedance of the circuit being checked. Thus, instead of providing indicator 70 with two zones on its scale, indicator 70 may be modified as shown in the indicator 70' of circuit checking apparatus 10 shown in FIG. 1C, to include an intermediate questionable or yellow zone. The intermediate zone on the scale would indicate an abnormality in the circuit which, while not immediately hazardous to the operating personnel, should be checked to avoid possible damage to the equipment and fire hazard.

In the example wherein the current limiting impedance was selected to be 150 ohms, a current flow of 50 amperes would require a resistor or reactor rated 375 KVA, if rated for continuous duty. However, since the circuit check may be quickly made, the current limiting impedance would not have to be rated for continuous duty, and thus may be substantially reduced in size. For example, a ceramic resistor rated for intermittent duty may be provided in the form of a circular bar. The ceramic resistor would quickly get hot and glow, but the casing 52 and the indicating device 70 of the circuit checking apparatus 10 can be suitably heat insulated.

Further, instead of the electromagnetic energy radiated by the glowing resistor being a disadvantage, it may be sensed and used to provide a signal indicative of the current flow magnitude, instead of sensing parameters such as current or voltage. A glowing resistor, for example one formed of silicon carbide, would provide heat and light responsive to current magnitude, either of which may be sensed by suitable transducers or photocells which convert electromagnetic radiation into an electrical quantity, or a variation in an electrical property, such as resistance.

Figure 1A:
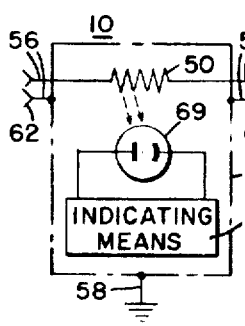
FIG. 1A is a schematic diagram of the circuit checking apparatus shown in FIG. 1, which illustrates an embodiment of the invention which employs a photovoltaic device.

FIG. 1A is a schematic diagram of the circuit checking apparatus 10 shown in FIG. 1, with like reference numerals referring to like components, in which a photovoltaic cell 69 is disposed adjacent current limiting impedance 50, which in this instance is in the form of a resistor which radiates electromagnetic energy when conducting current having a magnitude in the range which may flow through the apparatus 10. The photovoltaic cell is connected to indicating means 71 which may either directly indicate the magnitude of the signal provided by the photovoltaic device 71, or which may operate a fault indicator when the signal reaches a predetermined magnitude.

Figure 1C:
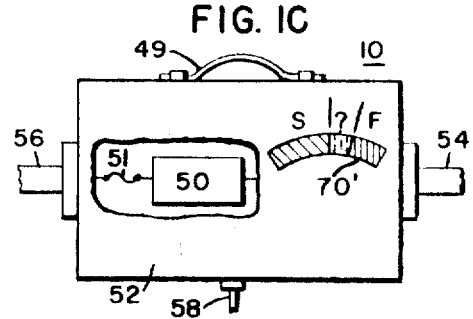
FIG. 1C is an elevational view of the circuit checking apparatus of FIG. 1, modified according to another embodiment of the invention.
Figure 1B:
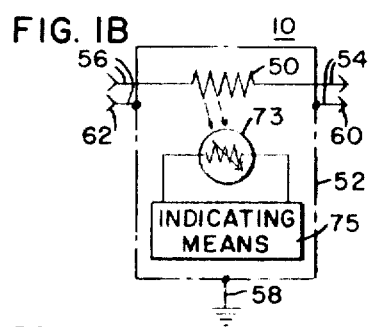
FIG. 1B is a schematic diagram of the circuit checking apparatus shown in FIG. 1, which illustrates an embodiment of the invention which employs a photoresistive device.

FIG. 1B is a schematic diagram of the circuit checking apparatus 10 shown in FIG. 1, in which a photoresistive cell 73 is disposed adjacent the glow type resistor 50, and is connected to indicating means 75. The indicating means 75, in this instance, would be a circuit which utilizes the drop in the resistance of the photoresistive cell when subjected to electromagnetic radiation, to trigger indicating means. For example, the photoresistive device 73 may be connected to gate a silicon controlled rectifier which is connected serially with the coil of a relay. The contacts of the relay may be connected to energize a fault indicator when the controlled rectifier is turned on and the relay is energized.

The duty on the current limiting impedance may be limited by constructing the circuit checking apparatus with a fuse connected in series with the current limiting impedance element. This embodiment of the invention is shown in FIG. 1C, which illustrates a fuse 51 connected in series with the current limiting impedance 50. Fuse 51 may be a standard expulsion type fuse, properly baffled. In the example wherein the impedance of the current limiting element was selected to be 150 ohms, a fuse having a minimum fusing current of about 40 amperes may be used, which blows in about 25 seconds at 50 amperes. If a fuse is used in series with current limiting impedance, the sensing and indicating means may be omitted if desired, since the fuse performs these functions. The fuse and current limiting impedance would be connecting in series with the circuit to be checked, with the connection being maintained for a predetermined period of time. If the fuse has not blown at the end of this time, it indicates that there are no low impedance faults in the circuit. If the fuse does blow, the elapsed time before blowing would give an indication of whether the fault has a high or a low impedance.

Figure 2:
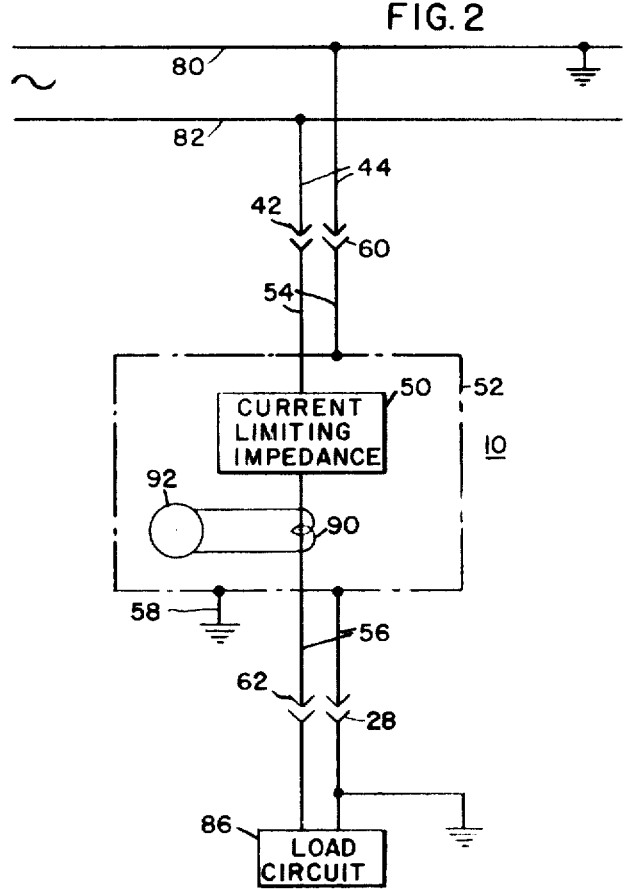
FIG. 2 is a schematic diagram of circuit checking apparatus constructed according to another embodiment of the invention, including a current limiting impedance, and means for measuring the magnitude of the current flow through the current limiting impedance.

FIG. 2 is a schematic diagram of the circuit checking apparatus 10 shown in FIG. 1, constructed according to another embodiment of the invention. Like reference numerals in FIGS. 1 and 2, as well as in the other FIGS., indicate like components. In this embodiment of the invention, cable 44 is shown connected to a source of AC potential, represented by conductors 80 and 82, with conductor 80 being connected to ground. Further, plug-in connector portion 28 is illustrated connected to a load circuit 86, which includes the transformer 12 shown in FIG. 1.

The circuit checking apparatus 10 of FIG. 2 includes sensing and indicating means 90 and 92, respectively, with sensing means 90 being a current transformer disposed to obtain a signal responsive to the magnitude of the current flow through current limiting impedance 50. The indicating means 92 may be an ammeter, analog or digital, which is connected to current transformer 90, and which provides a continuous indication of the current magnitude; or, indicating means 92 may be a go-no-go type of indicator which trips a flag when a predetermined current magnitude is exceeded, with the indicator being calibrated to trip upon an overload current magnitude which indicates the presence of a low impedance fault.

Figure 3:
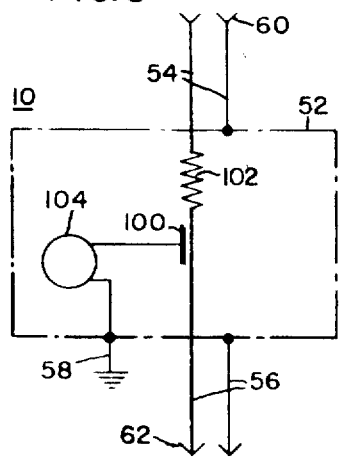
FIG. 3 is a schematic diagram of circuit checking apparatus constructed according to another embodiment of the invention, including a current limiting impedance, and means for measuring the voltage between the load side of the current limiting impedance and ground.

FIG. 3 is a schematic diagram which illustrates circuit checking apparatus 10, modified with sensing and indicating means of a different type than that of FIG. 2. The sensing means in this embodiment is a capacitive voltage divider 100 disposed in a predetermined capacitive relationship with the conductor connected to the load side of the current limiting impedance, which in this instance is illustrated as being a resistor 102. The signal picked up by the capacitive voltage divider 100 is connected to indicating means 104, which measures the magnitude of the voltage on the capacitive voltage divider 100 to ground. Indicating means 104 may be a voltmeter, analog or digital, which provides a continuous indication of the magnitude of the voltage on the load side of the resistor 102, to ground. In this embodiment of the invention, a low reading on the indicating means indicates the presence of a low impedance fault on the load circuit, while a higher reading indicates that it is safe to couple the load circuit with the source of potential. The indicating means may be suitably marked to indicate the safe and unsafe areas of the meter indicating range, taking into account the normal impedance of the load circuit, the magnitude of resistor 102, and the characteristics of the capacitive voltage divider 100. Since the connector portions of the circuit checking apparatus 10 are different at the source and load sides of the apparatus, there will be very little possibility of connecting the apparatus improperly, i.e., with the capacitive divider disposed on the source side of the current limiting impedance instead of on the load side. However, the possibility of improper connection could be eliminated, by modifying the circuit checking apparatus 10 shown in FIG. 3, to provide the circuit checking apparatus shown in FIG. 4.

Figure 4:
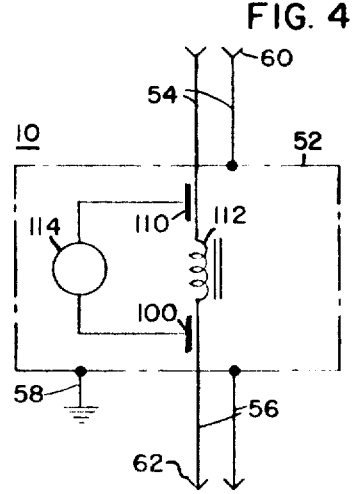
FIG. 4 is a schematic diagram of circuit checking apparatus constructed according to still another embodiment of the invention, including a current limiting impedance, and means for measuring the voltage drop across the current limiting impedance.

As illustrated in FIG. 4, circuit checking apparatus 10 includes an additional capacitive voltage divider 110, which is disposed on the source side of the current limiting impedance, which in this instance is illustrated as being an inductor 112. Indicating means 114 is connected between the capacitive voltage dividers 100 and 112, to measure the difference in potential between the two dividers. Indicating means 114, may be a voltmeter, analog or digital, or a go-no-go type of indicator with a flag may be used. A voltmeter will indicate a low reading when the load circuit is normal, and a higher reading when the load circuit has a low impedance fault. The difference in the readings will depend upon the relative magnitudes of the current limiting impedance and the normal impedance of the load circuit. The indicating means would be suitably marked and calibrated according to the characteristics of the capacitive voltage dividers, and the magnitude of the current limiting impedance.

While the circuit checking apparatus described herein has been related specifically to underground electrical systems with plug-in type connectors, it will be understood that the circuit checking apparatus may also be applied to overhead electrical systems. For example, the circuit checking apparatus 10 shown in FIG. 1 could be used for checking the condition of overhead electrical circuits by replacing plug-in connectors 60 and 62 with connectors designed to fit the movable element of a standard fuse cutout. In other words, the usual cutout element would be temporarily replaced with an insulating element designed to fit the fuse cutout, which has electrical leads at each end which extend to the circuit checking apparatus. Closing the cutout places the circuit checker in series with the circuit to be checked. Or, the circuit checking apparatus may have simple bolted type terminals, adapted to be connected between the load side of the fuse cutout and the load, such as a transformer.

In summary, there has been disclosed new and improved power circuit checking apparatus, which enables the maintenance and operating personnel of an electrical power company to check the condition of a load circuit, before connecting an energized connector portion of a separable connector with a mating portion connected to the load circuit. The circuit check, which may be quickly and efficiently made, will prevent separable couplings from being damaged and eliminate danger to the operating personnel, as the couplings will not be engaged when the load circuit has a low impedance fault. Further, the precircuit check for low impedance faults enables the separable connectors to be manufactured without fault close-in capability, which will substantially lower the cost of the separable connectors.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim:
1. Electrical circuit checking apparatus for determining the impedance of an electrical transformer and its load circuit prior to connecting an energized shielded connector thereto, comprising:
   a metallic enclosure, current limiting impedance means disposed in said metallic enclosure, the magnitude of said current limiting impedance means being selected to limit current flow therethrough to a predetermined value in the event of a zero impedance fault in the transformer or its load circuit;
   means for connecting said current limiting impedance means between the energized connector and the electrical transformer, including first and second electrical cables each having main conductor and shield portions, with the main conductor portions of said first and second electrical cables being connected to said current limiting impedance means, and the shield portions being connected to said metallic enclosure, conductor means connected to said metallic enclosure, and adapted for connection to ground;
   sensing means disposed in said metallic enclosure for obtaining a signal responsive to a predetermined parameter of said current limiting impedance means, when said current limiting impedance means is connected between the energized connector and the load circuit; and
   indicating means connected to said sensing means, which provides an indication of the magnitude of the signal from said sensing means, with said indicating means being calibrated to indicate the existence of a fault in the electrical transformer or its load circuit.
2. The electrical circuit checking apparatus of claim 1 wherein the current limiting impedance means is a resistor.
3. The electrical circuit checking apparatus of claim 1 wherein the current limiting impedance means is an inductor.
4. The electrical circuit checking apparatus of claim 1 wherein the sensing means is a current transformer which provides a signal in response to the magnitude of current flow through the current limiting impedance means, and the indicating means is an ammeter.
5. The electrical circuit checking apparatus of claim 1 wherein the sensing means is a capacitive voltage divider, capacitively coupled with the means for connecting the current limiting impedance means to the load circuit, and the indicating means is a voltmeter connected from the capacitive voltage divider to ground.

6. The electrical circuit checking apparatus of claim 1 wherein the sensing means includes first and second capacitive voltage dividers, capacitively coupled with the means for connecting the current limiting impedance means to the energized conductor and to the load circuit, respectively, and the indicating means is a voltmeter connected to said first and second capacitive voltage dividers.

7. The electrical circuit checking apparatus of claim 1 including a fuse connected in series with the current limiting impedance means, said fuse being selected to blow within a predetermined period of time when the magnitude of the current flowing through the fuse indicates a fault in the load circuit.

8. The electrical circuit checking apparatus of claim 1 wherein the current limiting impedance means is a resistor which radiates electromagnetic energy when current flows therethrough, and the sensing means provides a signal responsive to the energy level of the electromagnetic energy radiated by said resistor.

9. The electrical circuit checking apparatus of claim 8 wherein the sensing means is a photovoltaic device.

10. The electrical circuit checking apparatus of claim 8 wherein the sensing means is a photoresistive device.